United States Patent

Beaudoin et al.

[11] Patent Number: 6,099,011
[45] Date of Patent: Aug. 8, 2000

[54] BICYCLE TRAILER HITCH

[76] Inventors: Maurice Beaudoin, 850, 111e Avenue, Drummondville, Quebec, Canada, J2B 4L2; Richard Beaudoin, 809, 110e Avenue, Drummondville, Quebec, Canada, J2B 4L6

[21] Appl. No.: 09/032,304
[22] Filed: Feb. 27, 1998
[51] Int. Cl.[7] .................................................. B62K 27/12
[52] U.S. Cl. .......................................... 280/292; 280/204
[58] Field of Search .................................. 280/204, 292, 280/239, 288.4, 202, 495

[56] References Cited

U.S. PATENT DOCUMENTS

| | | | |
|---|---|---|---|
| 3,567,249 | 3/1971 | Robinson | 280/204 |
| 4,413,835 | 11/1983 | Hazelett | 280/204 |
| 4,721,320 | 1/1988 | Creps et al. | 280/292 |
| 5,020,814 | 6/1991 | George et al. | 280/401 |
| 5,669,618 | 9/1997 | Chiu | 280/204 |

FOREIGN PATENT DOCUMENTS 589480  3/1994  European Pat. Off. ............... 280/204

Primary Examiner—Anne Marie Boehler
Attorney, Agent, or Firm—Collard & Roe, P.C.

[57] ABSTRACT

A bicycle trailer hitch is disclosed, for attaching a forward arm of a bicycle trailer to a rear frame of a bicycle. The bicycle trailer hitch comprises a base mounting plate having two discs provided with grooves to position respectively the chain stay and the seat stay of a bicycle rear frame. A side plate covers and squeezes the chain stay and the seat stay against the base mounting plate under the action of tightening means which comprise a releasable-adjustable fastener coupled between the base mounting plate and the side plate. The base mounting plate is provided with flexible connecting means to link the forward arm of the trailer. The bicycle trailer hitch is easy and quick to install and release, and allows a firm and secure attachment.

7 Claims, 5 Drawing Sheets

BICYCLE TRAILER HITCH

FIELD OF THE INVENTION

The present invention relates to a trailer hitch for attaching a trailer to a bicycle. More particularly, it concerns a bicycle trailer hitch for attaching the forward arm of a bicycle trailer to the chain stay and seat stay of a bicycle.

BACKGROUND OF THE INVENTION

Bicycling is a common way of travelling. Bicycle trailers facilitate the cyclists to carry children, shopping and many other kinds of loads. Methods and hitches for attaching a bicycle trailer to a bicycle are various. A first type of bicycle trailer hitch already known in prior art is the one that connects the bicycle trailer to the seat parts of the bicycle which is above the gravity center of the bicycle. A drawback with this type of hitch is that it decreases the braking efficiency of the bicycle and trailer.

Also known in prior art, there is U.S. Pat. No. 4,721,320 that describes a bicycle trailer hitch which attaches to the bicycle between the chain stay and the seat stay at the crotch formed at the convergence of the two stays. The trailer hitch disclosed therein comprises a cone-plate member which fits within the crotch and two finger-like projections, one fixed and the other movable, which are positioned respectively on the outer side of the seat stay and chain stay. A means is provided for physically repositioning the movable finger-like projections. Although this trailer hitch overcomes certain drawbacks observed with other prior art trailer hitches, there is still presently a need for a bicycle trailer hitch which would be very easy to install, quick to manipulate, efficacious, low in cost and which could provide a firm attachment to the bicycle.

SUMMARY OF THE INVENTION

An object of the present invention is to provide a bicycle trailer hitch that satisfies these above-mentioned needs.

In accordance with the present invention, this object is achieved by providing a bicycle trailer hitch for attaching the forward arm of a bicycle trailer to the rear frame of a bicycle, the rear frame including a chain stay and a seat stay. The trailer hitch is characterized in that it comprises a base mounting plate having an inner face provided with a first positioning member to position the chain stay therein and a second positioning member to position the seat stay therein. The first positioning member comprises a first disc secured to the inner face of the base mounting plate facing the side plate, the first disc having an outer surface provided with a groove adapted to receive the chain stay. A side plate is provided parallel to the base mounting plate and is devised to cover the chain stay and the seat stay once positioned respectively in the first and second positioning member. The trailer hitch further comprises tightening means for bringing the side plate closer to the base mounting plate, thereby squeezing the chain stay and the seat stay therebetween and connecting means for connecting the base mounting plate to the forward arm of the trailer.

According to a preferred embodiment of the present invention, the tightening means comprise a threaded element which is a releasable-adjustable fastener coupled between the base mounting plate and the side plate for selectively bringing the side plate closer to the base mounting plate and releasing the side plate.

Also preferably, each of the first and second positioning members comprises a disc secured to the inner face of the base mounting plate facing the side plate. Each disc has an outer surface provided with a groove adapted to receive respectively the chain stay and the seat stay. One of the discs is preferably rotatively secured to the base mounting plate, thereby allowing the groove therein to be selectively positioned. It may also be translatably secured thereto.

The present invention also concerns a bicycle trailer hitch for attaching a forward arm of a bicycle trailer to a rear frame of a bicycle, the rear frame including a chain stay and a seat stay, and the trailer hitch comprising:

a base mounting plate having an inner face provided with a first positioning member to position the chain stay therein and a second positioning member to position the seat stay therein, one of the first and second positioning member comprising a disc secured to the inner face of the base mounting plate facing the side plate, the disc having an outer surface provided with a groove adapted to receive the respective stay;

a side plate parallel to the base mounting plate and devised to cover the chain stay and the seat stay once positioned respectively in the first and second positioning member;

tightening means for bringing the side plate closer to the base mounting plate, thereby squeezing the chain stay and the seat stay therebetween; and connecting means for connecting the base mounting plate to the forward arm of the trailer, and wherein the disc is rotatably and translatably secured to the base mounting plate by means of a screw passing through the centre of the disc, the screw being coupled with an elongated slot provided into the base mounting plate and adapted to receive an end of the screw, thereby allowing the groove therein to be selectively positioned.

Advantageously, a bicycle trailer hitch according to the present invention is very simple and quick to install on a bicycle frame. Moreover, because of the relatively few pieces composing this trailer hitch, the cost for manufacturing such trailer hitch is very low.

Furthermore, it can be appreciated that, according to a preferred embodiment of the present invention, this trailer hitch allows any adjustment to fit on different types of bicycles. More particularly, it can fit on bicycles having rear frames with different angles and distances between the chain stay and the seat stay.

The invention and its advantages will be better understood after reading the non restrictive description of a preferred embodiment of the present invention. This description is given with reference to the appended drawings.

DESCRIPTION OF A PREFERRED EMBODIMENT

Figure 1:
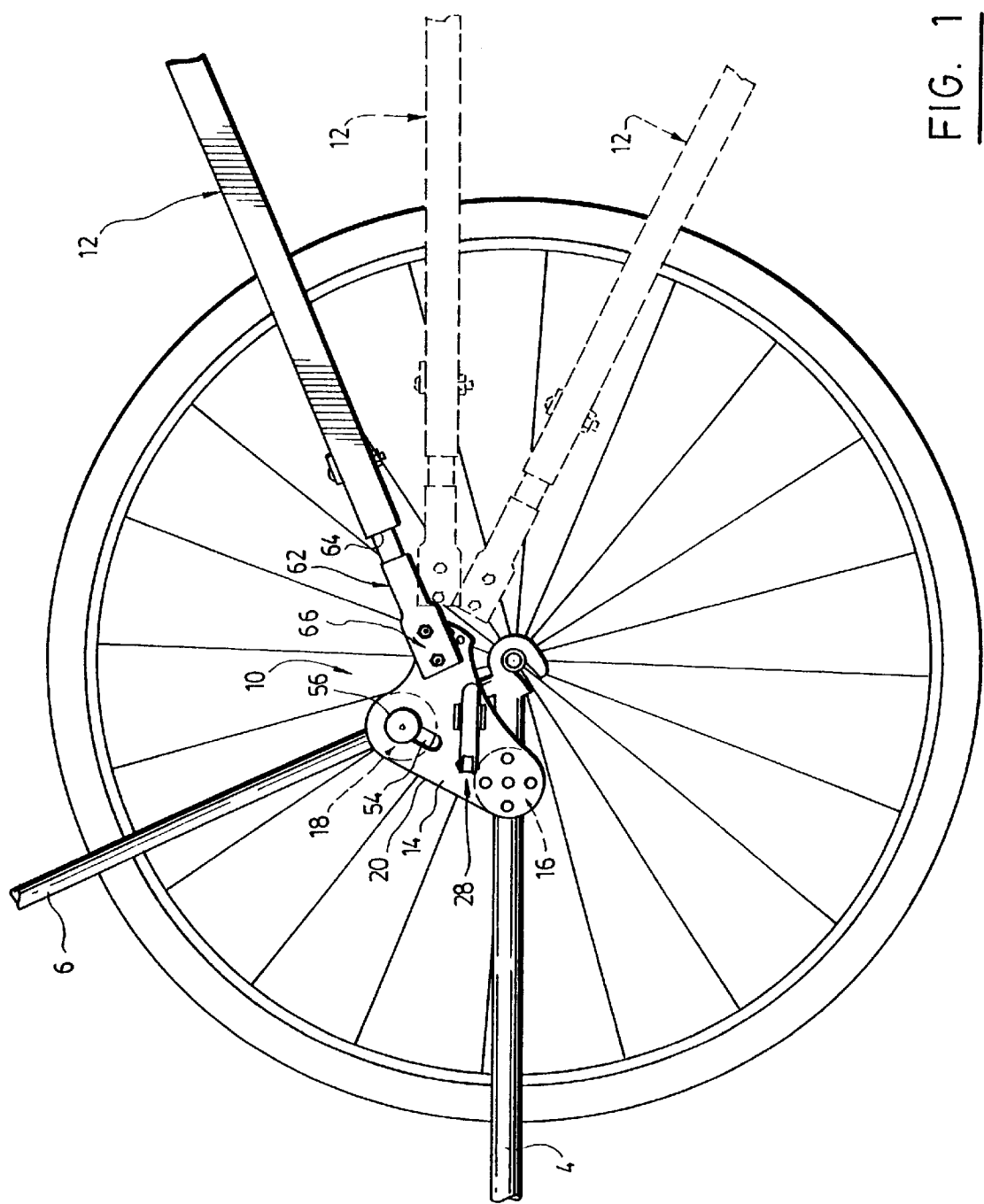
FIG. 1 is a side view of the rear frame and wheel of a bicycle on which a preferred embodiment of a bicycle trailer hitch according to the invention is mounted.
Figure 2:
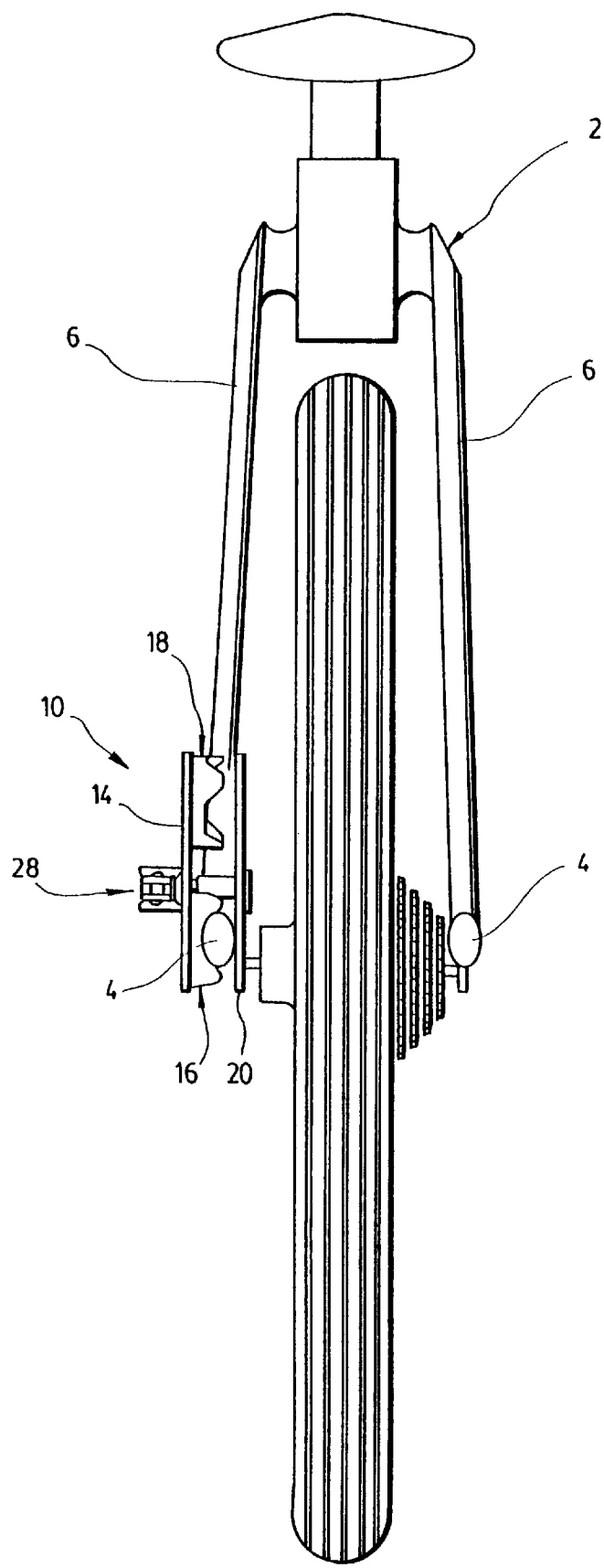
FIG. 2 is a rear view of the rear frame and wheel of the bicycle shown in FIG. 1.

Referring to FIGS. 1 and 2, a bicycle trailer hitch (10) according to the present invention is devised to attach the forward arm (12) of a bicycle trailer (not illustrated) to the rear frame (2) of a bicycle, more precisely to the chain stay (4) and the seat stay (6) of the rear frame (2). The designation of bicycle trailer means any kind of chariots or wheelbarrows that can be pulled by a bicycle.

Figure 3:
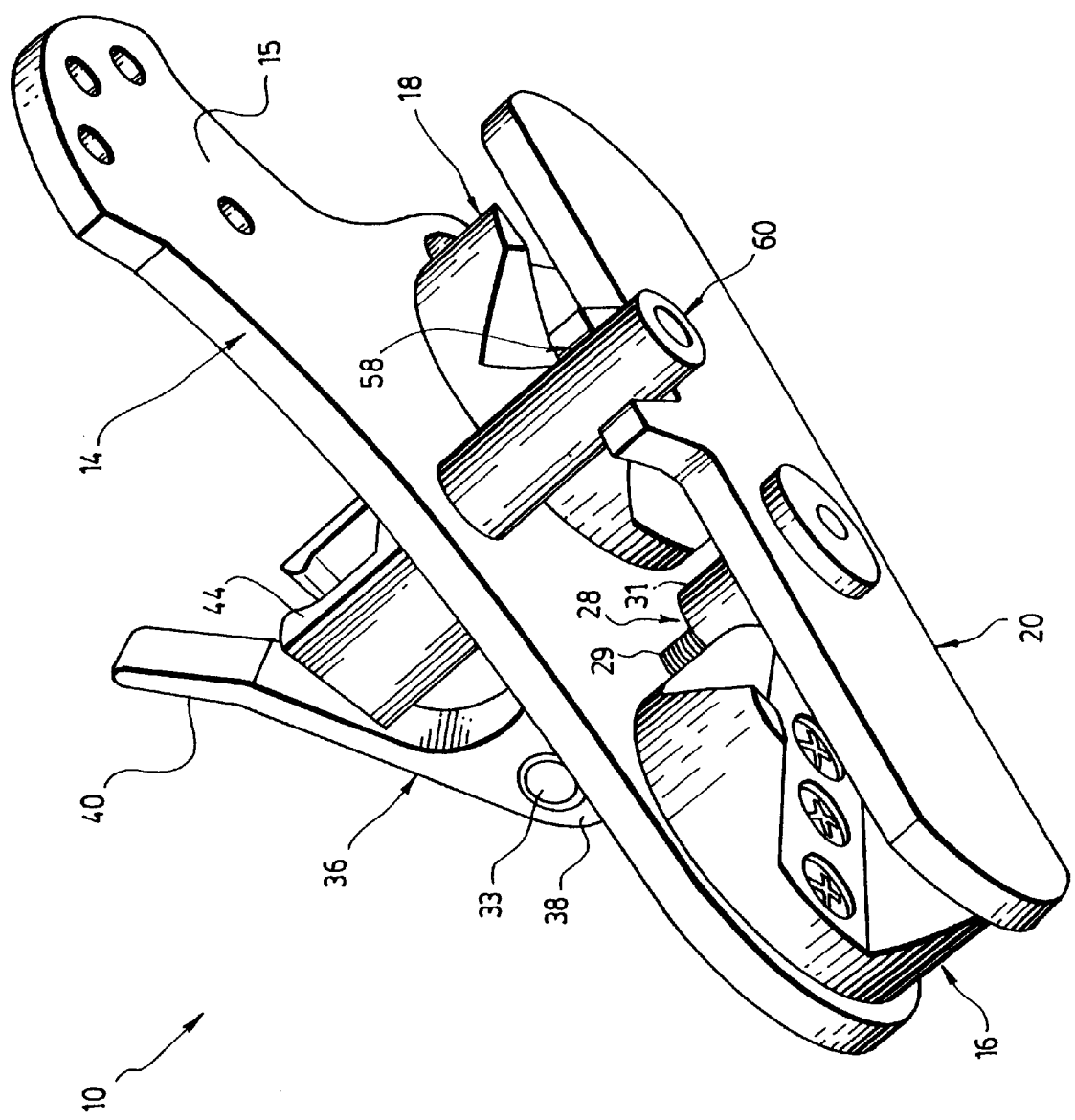
FIG. 3 is a bottom perspective view of the bicycle trailer hitch of FIG. 1.
Figure 4:
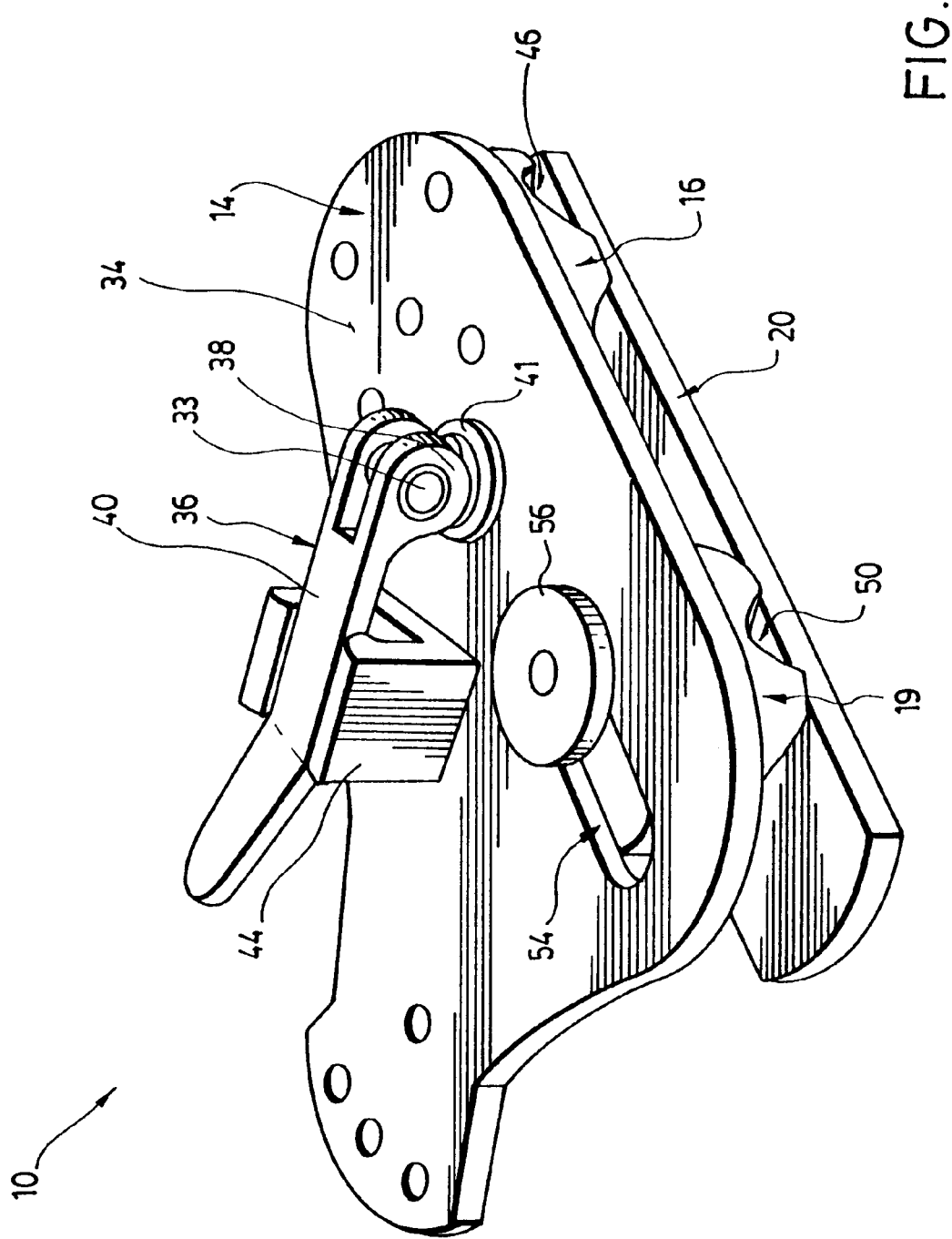
FIG. 4 is a top perspective view of the bicycle trailer hitch of FIG. 1.
Figure 5:
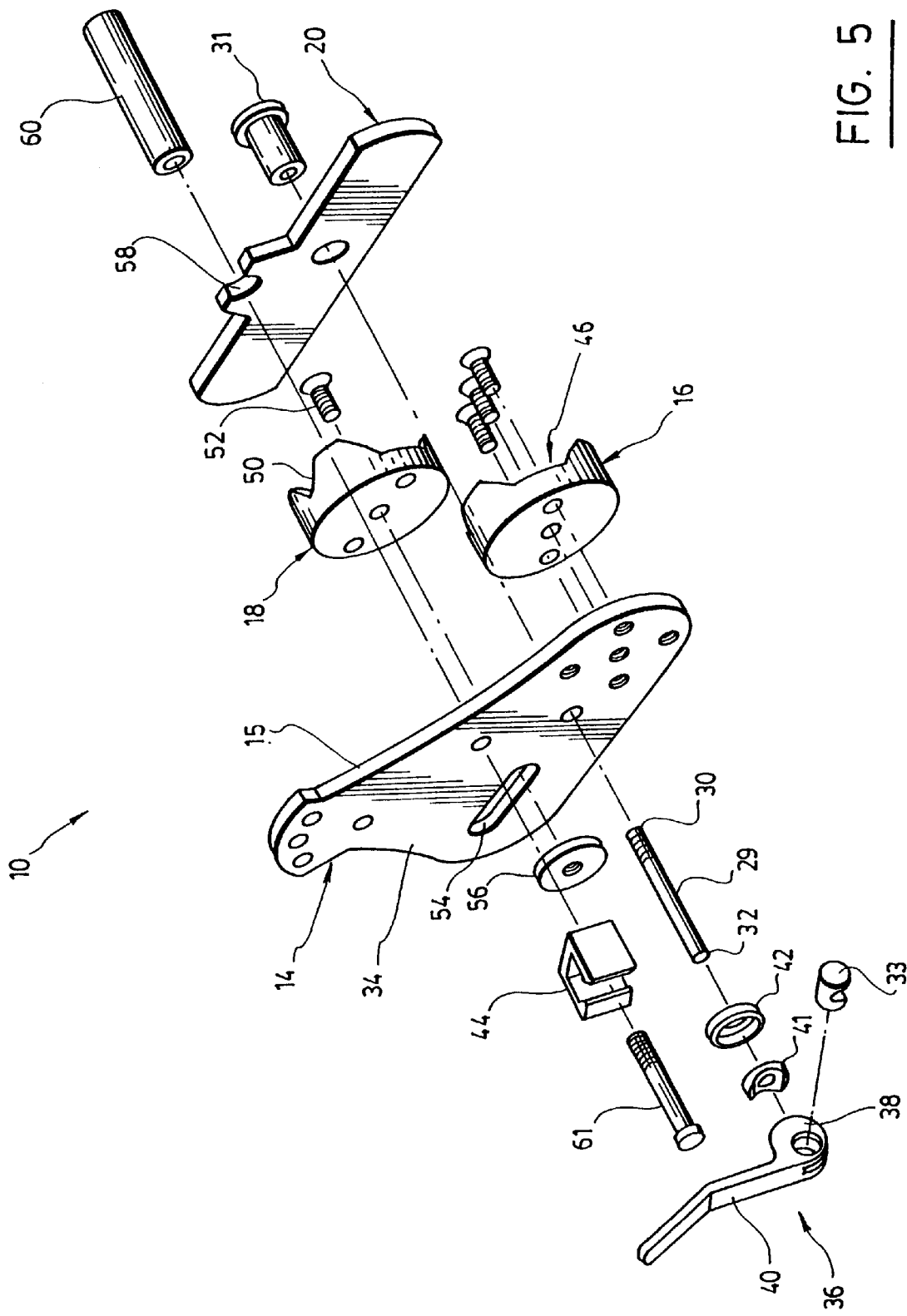
FIG. 5 is an exploded view of the bicycle trailer hitch of FIG. 1.

Referring now also to FIGS. 3, 4 and 5, the trailer hitch (10) comprises a base mounting plate (14) having an inner face (15) provided with a first positioning member (16) to position the chain stay (4) therein and a second positioning member (18) to position the seat stay (6) therein. The bicycle trailer hitch (10) further comprises a side plate (20) parallel to the base mounting plate (14). This side plate (20) is devised to cover the chain stay (4) and the seat stay (6) once positioned respectively in the first positioning member (16) and the second positioning member (18), as shown in FIG. 2. Tightening means are provided with the trailer hitch (10) for bringing the side plate (20) closer to the base mounting plate (14), thereby squeezing the chain stay (4) and the seat stay (6) therebetween.

As illustrated in FIGS. 3 and 5, the tightening means preferably comprise a threaded element (28) connecting the side plate (20) to the base mounting plate (14). The threaded element (28) may be any screwable fastener known in the art or it may preferably be a releasable-adjustable fastener, or also called a quick-release fastener, coupled between the base mounting plate (14) and the side plate (20), as shown more particularly in FIGS. 3 to 5. Advantageously, this releasable-adjustable fastener (28) may selectively bring the side plate (20) closer to the base mounting plate (14) or release the side plate (20). In the particular preferred embodiment illustrated in FIGS. 3 to 5, the releasable-adjustable fastener (28) comprises a dowel pin (29) coupling the side plate (20) and the base mounting plate (14) together. The dowel pin (29) has a first end (30) screwable in a threaded anchoring element (31) mounted on the side plate (20) and a second end (32) coming out of the outer surface (34) of the base mounting plate (14). This second end (32) is provided with a movable handle (36) that is pivotally connected thereto. This movable handle (36) comprises a rounded portion (38) pivotally connected to the second end (32) of the pin (29) by means of a pivot (33) and an elongated portion (40). The rounded portion (38) lies on a grooved nut (41) to facilitate its rotational movement. A washer (42) is also provided under the grooved nut (40).

For the purpose of installation, the elongated portion (40) is initially upwards to release the side plate (20) from the base mounting plate (14), thereby allowing the user to install the hitch (10) on the rear frame (2) of a bicycle (1) by positioning the chain stay (4) and the seat stay (6) in the first and second positioning members (16,18). To squeeze the chain stay (4) and the seat stay (6) between the side plate (20) and the base mounting plate (14), the dowel pin (29) is first screwed into the threaded anchoring element (31) and then the elongated portion (40) of the handle (36) is pivoted from its initial position to a position where it is perpendicular with the remaining of the dowel pin (29) and clamped into a tightening bracket (44) mounted on the outer surface (34) of the base mounting plate(14). FIG. 3 shows the handle (36) in the clamped position.

The threaded element (28) including the dowel pin (29) and the handle (36) is preferably made of metal but any other resistant material can satisfy the needs. The clamping support (44) is advantageously made of a hard plastic. Any other mechanism to hold or clamp the handle (36) after tightening the treaded element (28), and thereof, keep the chain stay (4) and the seat stay (6) squeezed, could be imagined to satisfy these needs.

Referring more particularly to FIGS. 3 to 5, the first positioning member (16) of the trailer hitch (10) preferably consists of a first disc (16) secured to the inner face (15) of the base mounting plate (14) and having a visible or apparent outer surface facing the side plate (20) provided with a groove (46) adapted to receive the chain stay (4). The second positioning member preferably consists of a second disc (18) also secured to the inner face (15) of the base mounting plate (14). As for the first disc (16), the second disc (18) has a visible outer surface provided with a groove (50) adapted to receive the seat stay (6). The first disc (16) and the second disc (18) are similar and they are preferably made of a hard plastic to avoid scratching the stays.

The base mounting plate (14) and the side plate (20) are preferably made of tempered steel but other resistant materials can be used.

Advantageously, one of the first disc (16) and second disc (18) may be adjustable to enable the bicycle trailer hitch (10) to fit on the rear frame of different bicycles having different angles and distances between the chain stay (4) and the seat stay (6). In the preferred embodiment illustrated therein, the adjustable disc is the second disc (18), the one that fits on the seat stay (6). To provide these adjustments, the second disc (18) is rotatably secured to the base mounting plate (14), thereby allowing the groove therein to be selectively positioned. This second disc (18) may also be translatably secured to the base mounting plate (14). Referring more particularly to FIGS. 4 and 5, this second disc (18) is rotatably and translatably secured to the base mounting plate (14) by means of a screw (52) passing through the centre of the second disc (18). This screw (52) is coupled with an elongated slot (54) provided into the base mounting plate (14) and adapted to receive an end of the screw (52). The head of the screw (52) is rammed into the second disc (18) and the end of the screw (52) is blocked with a washer (56). Preferably, the washer (56) is made of a hard plastic but any other resistant material, like metal, that satisfies the needs, is acceptable.

Referring to FIGS. 3 and 5, the side plate (20) preferably comprises means for selectively preventing a rotational movement thereof around the threaded element (28) located in a middle portion of the side plate (20). For this purpose, a notch (58) is provided along the periphery of the side plate (20) and is coupled with a pin (60) extending from the base mounting plate (14) towards the side plate (20). As shown, this pin (60) may also be coupled with the bracket (44) by means of a bolt (61). As can be appreciated, this mechanism prevents the rotation of the side plate (20) that covers the chain stay (4) and the seat stay (6), particularly when the threaded element (28) is tightened. Preferably, the pin (60) also serves to prevent the hitch (10) from sliding rearwards, as it is mounted on the back frame (2) and the trailer is towed by the bicycle abutting on the seat stay (6). This mechanism is only preferential to the present invention and is provided only for ease of installation. In fact, the user may simply hold the side plate (20) tightly with his/her hand upon tightening of the threaded element (28).

The bicycle trailer hitch (10) of the present invention further comprises connecting means for connecting the base mounting plate (14) to the forward arm (12) of the trailer. Referring to FIG. 1, the connecting means preferably comprise a flexible tube (62) having an end (64) attached to the forward arm (12) and another end (66) covered with a metallic plate securable to the base mounting plate (14). As illustrated in FIG. 1, the flexible tube (12) may be secured to different locations on the base mounting plate (14) depending on the height of the trailer to tow. The flexible tube (62) is preferably made of rubber to lightly bend under side pressures coming from the bicycle trailer in movement.

Advantageously, a bicycle trailer hitch (10) according to the present invention is very simple to mount on the rear frame of a bicycle. The user simply has to release the threaded element (28), position the chain stay (4) and the seat stay (6) of the bicycle in their respective positioning members (16,18) and tighten the threaded element to squeeze the chain stay (4) and the seat stay (6) between the base mounting plate (14) and the side plate (20).

As can be appreciated, a bicycle trailer hitch according to the present invention provides a quick way to firmly attach the forward arm of any bicycle trailer to different types of bicycles. The size of the grooves provided in the first disc (16) and second disc (18) are intended to fit on most chain stays (4) and seat stays (6), and different sizes can be imagined to fit on special frames or on rear frames of motorized bicycles.

Although a preferred embodiment of the invention has been described in detail herein and illustrated in the accompanying drawings, it is to be understood that the invention is not limited to this precise embodiment and that various changes and modifications may be effected therein without departing from the scope or spirit of the invention.

What is claimed is:

1. A bicycle trailer hitch for attaching a forward arm of a bicycle trailer to a rear frame of a bicycle, the rear frame including a chain stay and a seat stay, the trailer hitch comprising:

a base mounting plate having an inner face provided with a first positioning member to position the chain stay therein and a second positioning member to position the seat stay therein, the first positioning member comprising a first disc secured to the inner face of the base mounting plate facing the side plate, the first disc having an outer surface provided with a groove adapted to receive the chain stay and the second positioning member comprising a second disc secured to the inner face of the base mounting plate, the second disc having an outer surface provided with a groove adapted to receive the seat stay;

a side plate parallel to the base mounting plate and devised to cover the chain stay and the seat stay once positioned respectively in the first and second positioning member;

tightening means for bringing the side plate closer to the base mounting plate, thereby squeezing the chain stay and the seat stay therebetween; and connecting means for connecting the base mounting plate to the forward arm of the trailer; and wherein one of the first and second discs is rotatable and translatable secured to the base mounting plate by means of a screw passing through the center of said one disc, the screw being coupled with an elongated slot provided into the base mounting plate and adapted to receive an end of the screw, thereby allowing the groove therein to be selectively positioned.

2. A bicycle trailer hitch as claimed in claim 1, wherein the tightening means comprise a threaded element connecting the side plate to the base mounting plate.

3. A bicycle trailer hitch as claimed in claim 2, wherein the threaded element is a releasable-adjustable fastener coupled between the base mounting plate and the side plate for selectively bringing the side plate closer to the base mounting plate and releasing the side plate.

4. A trailer hitch as claimed in claim 3, comprising means for selectively preventing a rotational movement of the side plate around the threaded element.

5. A trailer hitch as claimed in claim 4, wherein the means for selectively preventing a rotational movement of the side plate comprise the side plate having a notch along a periphery thereof coupled with a pin extending from the base mounting plate towards the side plate.

6. A trailer hitch as claimed in claim 5, wherein the connecting means for connecting the base mounting plate to the forward arm of the trailer comprise a flexible tube having an end attached to an end of the forward arm and another end secured to the base mounting plate.

7. A bicycle trailer hitch for attaching a forward arm of a bicycle trailer to a rear frame of a bicycle, the rear frame including a chain stay and a seat stay, the trailer hitch comprising:

a base mounting plate having an inner face provided with a first positioning member to position the chain stay therein and a second positioning member to position the seat stay therein, one of the first and second positioning members comprising a disc secured to the inner face of the base mounting plate facing the side plate, said disc having an outer surface provided with a groove adapted to receive the respective stay;

a side plate parallel to the base mounting plate and devised to cover the chain stay and the seat stay once positioned respectively in the first and second positioning member;

tightening means for bringing the side plate closer to the base mounting plate, thereby squeezing the chain stay and the seat stay therebetween; and connecting means for connecting the base mounting plate to the forward arm of the trailer, wherein said disc is rotatably and translatably secured to the base mounting plate by means of a screw passing through the center of said disc, the screw being coupled with an elongated slot provided into the base mounting plate and adapted to receive an end of the screw, thereby allowing the groove therein to be selectively positioned.

* * * * *